(12) United States Patent
Morita et al.

(10) Patent No.: US 10,120,355 B2
(45) Date of Patent: Nov. 6, 2018

(54) VEHICLE LOAD CONTROL DEVICE, METHOD OF REWRITING CONTROL PROGRAM FOR THE SAME, AND CONTROL PROGRAM REWRITING SYSTEM

(71) Applicant: Yazaki Corporation, Tokyo (JP)

(72) Inventors: Satoshi Morita, Shizuoka (JP); Yoshihide Nakamura, Shizuoka (JP); Yasuyuki Shigezane, Shizuoka (JP); Yoshinori Ikuta, Shizuoka (JP); Shuuji Satake, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/794,924

(22) Filed: Oct. 26, 2017

(65) Prior Publication Data

US 2018/0120797 A1   May 3, 2018

(30) Foreign Application Priority Data

Oct. 27, 2016  (JP) ................. 2016-210658

(51) Int. Cl.
  *G05B 15/02*   (2006.01)
  *B60R 16/03*   (2006.01)

(52) U.S. Cl.
  CPC ............. *G05B 15/02* (2013.01); *B60R 16/03* (2013.01)

(58) Field of Classification Search
  CPC ............................... G05B 15/02; B60R 16/03
  USPC ................................... 307/10.1, 9.1
  See application file for complete search history.

(56) References Cited

U.S. PATENT DOCUMENTS

| 6,356,826 | B1 | 3/2002 | Pohjola |
| 6,469,404 | B1 | 10/2002 | Pohjola |
| 6,472,770 | B1 | 10/2002 | Pohjola |
| 2006/0238938 | A1* | 10/2006 | Shaya ............ H03K 17/0822 361/78 |
| 2014/0297099 | A1* | 10/2014 | Drew ............ G07C 5/0808 701/31.4 |

FOREIGN PATENT DOCUMENTS

JP            4143712 B2    6/2008

* cited by examiner

*Primary Examiner* — Daniel Kessie
(74) *Attorney, Agent, or Firm* — Kenealy Vaidya LLP

(57) ABSTRACT

A vehicle load control device repeats a determination state in which at least one of a plurality of switching elements is turned off from an initial state in which the switching elements are all in an ON state until all of the switching elements have different ON/OFF states, and determines a connection form for each connection portion based on the change between an initial current value detected in the initial state and a determination current value detected for each determination state.

5 Claims, 8 Drawing Sheets

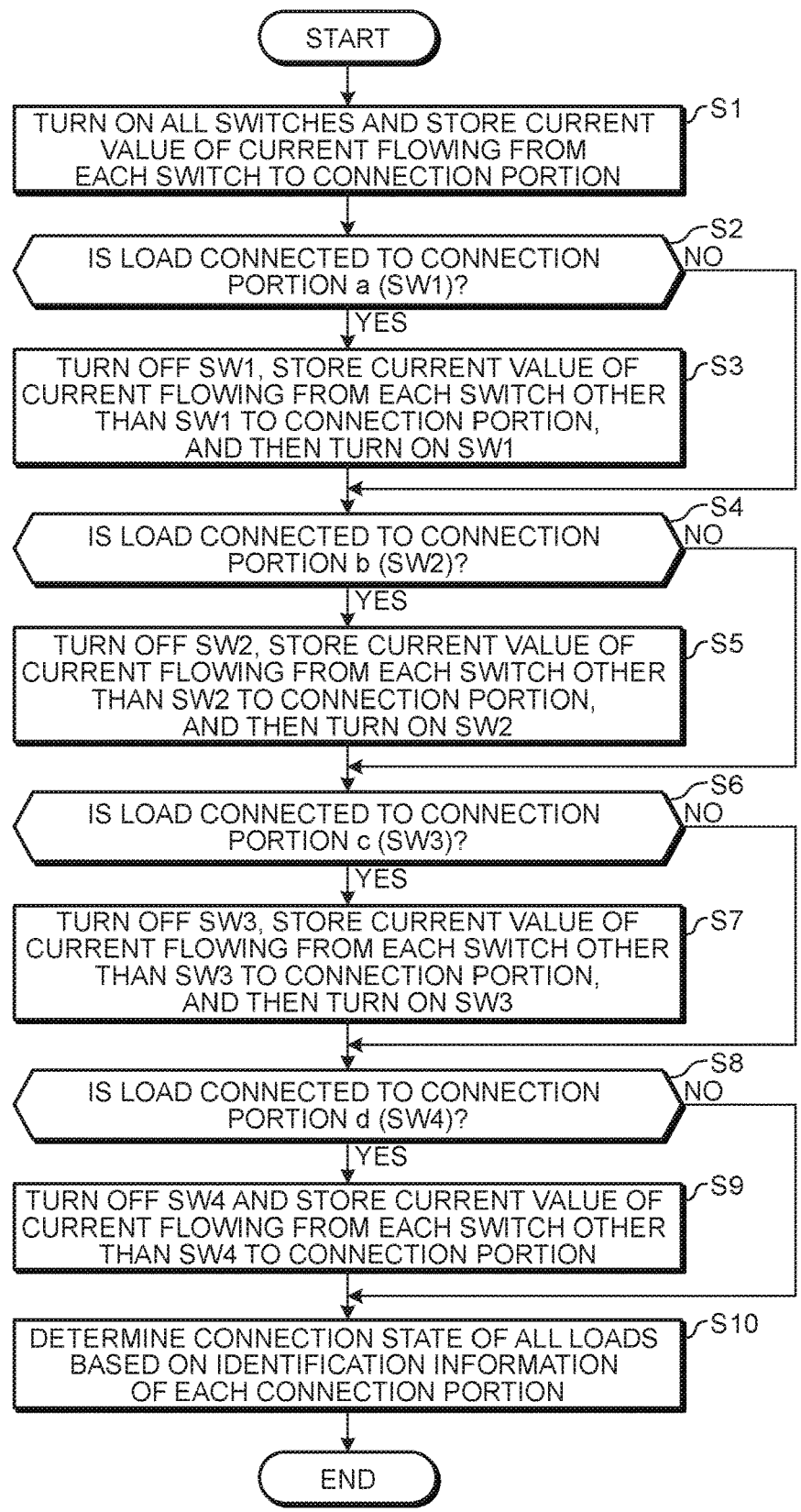

FIG.5

| HOW CURRENT VALUE FLOWING IN CONNECTION PORTIONS b-d CHANGES WHEN SW1 IS OFF | | | | IDENTIFICATION INFORMATION (bit) EXPRESSING CONNECTION STATE OF CONNECTION PORTION a (SW1) |
|---|---|---|---|---|
| CONNECTION PORTION b (SW2) | CONNECTION PORTION c (SW3) | CONNECTION PORTION d (SW4) | | |
| NO CHANGE | NO CHANGE | NO CHANGE | ⇒ | 0X00 or 0X0A |
| INCREASE | NO CHANGE | NO CHANGE | ⇒ | 0X01 or 0X07 |
| NO CHANGE | INCREASE | NO CHANGE | ⇒ | 0X02 or 0X08 |
| NO CHANGE | NO CHANGE | INCREASE | ⇒ | 0X03 or 0X09 |
| INCREASE | INCREASE | NO CHANGE | ⇒ | 0X0B |
| INCREASE | NO CHANGE | INCREASE | ⇒ | 0X0C |
| NO CHANGE | INCREASE | INCREASE | ⇒ | 0X0D |
| INCREASE | INCREASE | INCREASE | ⇒ | 0X0E |

| IDENTIFICATION INFORMATION (bit) EXPRESSING CONNECTION STATE | CONNECTION PORTION a (SW1) | CONNECTION PORTION b (SW2) | CONNECTION PORTION c (SW3) | CONNECTION PORTION d (SW4) |
|---|---|---|---|---|
| 0X00 | | | | |
| 0X01 | ●—————● | | | |
| 0X02 | ●—————————————● | | | |
| 0X03 | ●———————————————————————● | | | |
| 0X04 | | ●—————● | | |
| 0X05 | | ●———————————————● | | |
| 0X06 | | | ●—————● | |
| 0X07 | ●—————●  ●—————● | | | |
| 0X08 | ●  ●————●  ●  ● | | | |
| 0X09 | ●  ●—————●  ● | | | |
| 0X0A | | ●—————●—————● | | |
| 0X0B | ●—————●—————● | | | |
| 0X0C | ●—————●—————————————● | | | |
| 0X0D | | ●—————●—————● | | |
| 0X0E | ●—————●—————●—————● | | | |

FIG.7

| COMBINATION OF IDENTIFICATION INFORMATION EXPRESSING CONNECTION STATE | | | | DETERMINATION RESULT OF CONNECTION STATE |
|---|---|---|---|---|
| CONNECTION PORTION a (SW1) | CONNECTION PORTION b (SW2) | CONNECTION PORTION c (SW3) | CONNECTION PORTION d (SW4) | |
| =0X00 | =0X00 | =0X00 | | ALL CONNECTION PORTIONS: SINGLE CONNECTION |
| | | ≠0X00 | | CONNECTION PORTIONS c, d: PARALLEL CONNECTION |
| | ≠0X00 | =0X00 | | CONNECTION PORTIONS b, d: PARALLEL CONNECTION |
| | | ≠0X00 | =0X00 | CONNECTION PORTIONS b, c: PARALLEL CONNECTION |
| | | | ≠0X00 | CONNECTION PORTIONS b, c, d: PARALLEL CONNECTION |
| =0X01 | | =0X00 | | CONNECTION PORTIONS a, b: PARALLEL CONNECTION |
| | | ≠0X00 | | CONNECTION PORTIONS a, b: PARALLEL CONNECTION  CONNECTION PORTIONS c, d: PARALLEL CONNECTION |
| =0X02 | =0X00 | | | CONNECTION PORTIONS a, c: PARALLEL CONNECTION |
| | ≠0X00 | | | CONNECTION PORTIONS a, c: PARALLEL CONNECTION  CONNECTION PORTIONS b, d: PARALLEL CONNECTION |
| =0X03 | =0X00 | | | CONNECTION PORTIONS a, d: PARALLEL CONNECTION |
| | ≠0X00 | | | CONNECTION PORTIONS a, d: PARALLEL CONNECTION  CONNECTION PORTIONS b, c: PARALLEL CONNECTION |
| =0X0B | | | | CONNECTION PORTIONS a, b, c: PARALLEL CONNECTION |
| =0X0C | | | | CONNECTION PORTIONS a, b, d: PARALLEL CONNECTION |
| =0X0D | | | | CONNECTION PORTIONS a, c, d: PARALLEL CONNECTION |
| =0X0E | | | | ALL CONNECTION PORTIONS: PARALLEL CONNECTION |

VEHICLE LOAD CONTROL DEVICE, METHOD OF REWRITING CONTROL PROGRAM FOR THE SAME, AND CONTROL PROGRAM REWRITING SYSTEM

CROSS-REFERENCE TO RELATED APPLICATION(S)

The present application claims priority to and incorporates by reference the entire contents of Japanese Patent Application No. 2016-210658 filed in Japan on Oct. 27, 2016.

BACKGROUND OF THE INVENTION

1. Field of the Invention

The present invention relates to a vehicle load control device, a method of rewriting a control program for the same, and a control program rewriting system.

2. Description of the Related Art

A vehicle load control device is mounted on a vehicle such as an automobile, and connects a power source such as a battery to a plurality of loads such as a lamp and a motor via a plurality of switching elements. The switching elements are controlled to be turned on or off by a microcomputer (for example, see Japanese Patent No. 4143712). The microcomputer controls the driving of the loads by turning on or off the switching elements.

However, although the aforementioned vehicle load control device can control the driving of a load having a large load current by connecting a plurality of switching elements to one load and turning on or off the switching elements at the same time, there is still room for improvement because it is not possible to automatically determine how the load is connected to connection portions of the respective switching elements.

SUMMARY OF THE INVENTION

The present invention has been made in view of the above, and an object of the present invention is to provide a vehicle load control device, a method of rewriting a control program for the same, and a control program rewriting system, which can automatically determine a connection form of a load connected to a plurality of connection portions.

In order to achieve the above mentioned object, a vehicle load control device according to one aspect of the present invention includes a plurality of connection portions that are connected in parallel to a power source of a vehicle and one or more of which are connectable to one load, a plurality of switching elements that are provided to correspond to respective connection portions, each of the switching elements supplying power from the power source to the connection portion when the switching element is in an ON state, and blocking power from the power source when the switching element is in an OFF state, a controller configured to have a determination mode in which the switching elements are individually controlled based on a control program and a connection form in which the plurality of connection portions are connected to the load is determined, and a current detector configured to detect a current value of current flowing in the connection portion when the switching element is in the ON state, wherein the controller in the determination mode repeats a determination state in which at least one of the switching elements is turned off from an initial state in which the switching elements are all in the ON state until all of the switching elements have different ON/OFF states, and determines the connection form for each connection portion based on a change between an initial current value detected in the initial state and a determination current value detected for each determination state, and the controller controls the switching elements individually based on the control program in accordance with the connection form determined by the determination mode.

According to another aspect of the present invention, the vehicle load control device may further include a communication unit configured to communicate with an information processing device in a wired or wireless manner, wherein the communication unit may transmit identification information indicating the connection form determined by the determination mode to the information processing device, and receive the control program selected in accordance with the identification information indicating the connection form in the information processing device, and the controller may rewrite the control program stored in advance into the control program received by the communication unit.

According to still another aspect of the present invention, in a control program rewriting method for vehicle load control device including a plurality of connection portions that are connected in parallel to a power source of a vehicle and one or more of which are connectable to one load, a plurality of switching elements that are provided to correspond to respective connection portions, each of the switching elements supplying power from the power source to the connection portion when the switching element is in an ON state, and blocking power from the power source when the switching element is in an OFF state, a controller configured to have a determination mode in which a connection form in which the plurality of connection portions are connected to the load is determined and to control the switching elements individually based on a control program in accordance with the connection form determined by the determination mode, a current detector configured to detect a current value of current flowing in the connection portion when the switching element is in the ON state, and a communication unit configured to communicate with an information processing device in a wired or wireless manner, the control program rewriting method includes the steps of: by the controller in the determination mode, repeating a determination state in which at least one of the switching elements is turned off from an initial state in which the switching elements are all in the ON state until all of the switching elements have different ON/OFF states, and determining the connection form for each connection portion based on a change between an initial current value detected in the initial state and a determination current value detected for each determination state, by the communication unit, transmitting identification information indicating the connection form determined at the determining to the information processing device, by the communication unit, receiving the control program selected in accordance with the identification information indicating the connection form in the information processing device, and by the controller, rewriting the control program stored in advance into the control program received at the receiving.

According to still another aspect of the present invention, in a control program rewriting system in which a vehicle load control device is communicably connected to an information processing device, the vehicle load control device includes a plurality of connection portions that are connected in parallel to a power source of a vehicle and one or more of which are connectable to one load, a plurality of switching elements that are provided to correspond to respective connection portions, each of the switching elements supplying power from the power source to the connection portion when the switching element is in an ON state, and blocking power from the power source when the switching element is in an OFF state, a controller configured to have a determination mode in which the switching elements are controlled individually based on a control program and a connection form in which the plurality of connection portions are connected to the load is determined, a current detector configured to detect a current value of current flowing in each of the connection portions when the switching element is in the ON state, and a first communication unit configured to communicate with the information processing device in a wired or wireless manner, wherein the controller in the determination mode repeats a determination state in which at least one of the switching elements is turned off from an initial state in which the switching elements are all in an ON state until all of the switching elements have different ON/OFF states and determines the connection form for each connection portion based on a change between an initial current value detected in the initial state and a determination current value detected for each determination state, the first communication unit transmits identification information indicating the connection form determined by the controller to the information processing device, and receive the control program selected in accordance with the identification information indicating the connection form in the information processing device, the controller rewrites the control program stored in advance into the control program received in the first communication unit, the information processing device includes a second communication unit that receives the identification information indicating the connection form from the vehicle load control device, a storage unit that stores therein a plurality of control programs, and a selection unit that selects the control program in accordance with the identification information indicating the connection form received in the second communication unit from among the control programs stored in advance in the storage unit, and the second communication unit transmits the control program selected by the selection unit to the vehicle load control device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart illustrating one example of a determination process of the connection form to be executed in the vehicle load control device in a determination mode;

FIG. 5 is an explanatory view for describing a method of determining a connection form of a plurality of loads with respect to the vehicle load control device;

FIG. 6 illustrates one example of table information indicating a relationship between identification information indicating the connection form and a connection form pattern;

FIG. 7 illustrates one example of the table information indicating the relationship between the combination of identification information indicating the connection form of each connection portion and a determination result of the connection form;

DETAILED DESCRIPTION OF THE PREFERRED EMBODIMENTS

An embodiment of a vehicle load control device, a method of rewriting a control program for the same, and a control program rewriting system according to the present invention will hereinafter be described in detail with reference to the drawings. The present invention is not limited to the embodiment to be described below. The component in the embodiment below includes the component that is replaceable and easily conceivable by what is called a person skilled in the art or the component that is substantially the same. The component in the embodiment below can be variously omitted, replaced, or changed within the range not departing from the concept of the present invention.

Embodiment

Figure 1:
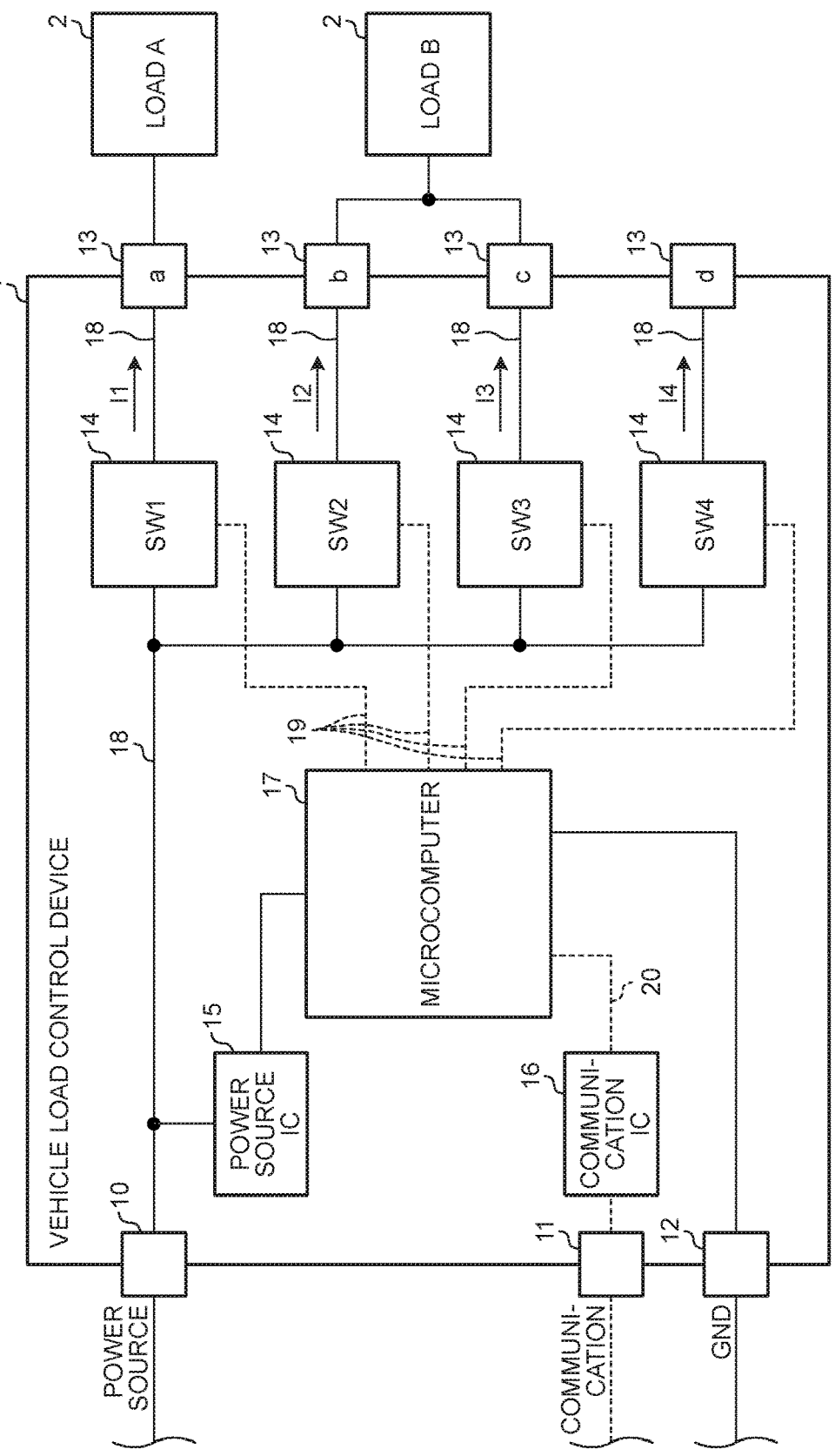
FIG. 1 is a schematic structure view illustrating one example of a vehicle load control device according to an embodiment.
Figure 2:
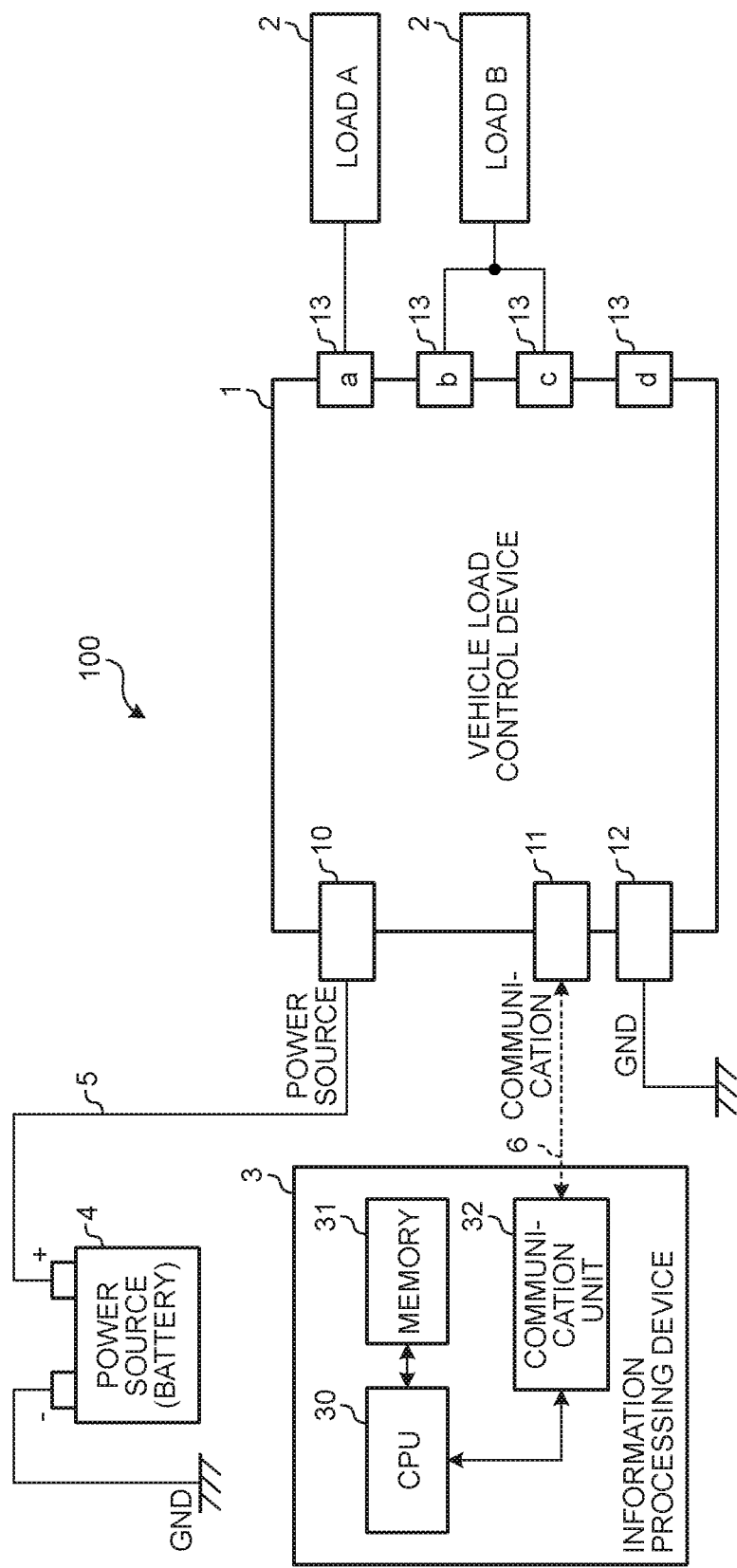
FIG. 2 is a schematic structure view illustrating one example of a control program rewriting system according to an embodiment.
Figure 3:
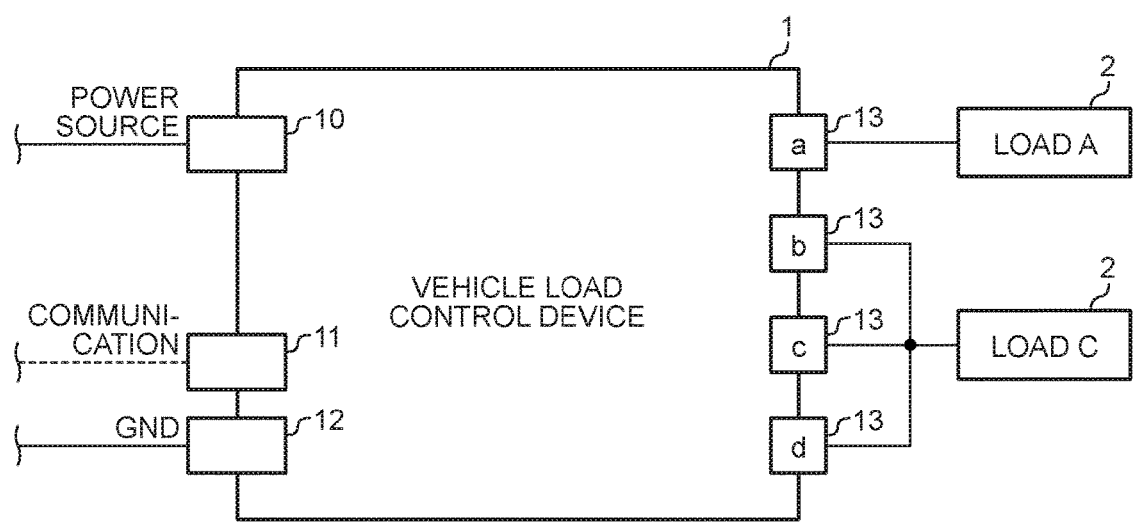
FIG. 3 illustrates one example of a connection form of a plurality of loads with respect to the vehicle load control device.

FIG. 1 is a schematic structure view illustrating one example of a vehicle load control device according to an embodiment, and FIG. 2 is a schematic structure view illustrating one example of a control program rewriting system according to the embodiment. FIG. 3 illustrates one example of a connection form of a plurality of loads with respect to a vehicle load control device. Note that FIG. 2 illustrates a structure example of the control program rewriting system in which an information processing device is communicably connected to the vehicle load control device illustrated in FIG. 1.

A vehicle load control device 1 illustrated in FIG. 1 and FIG. 2 is mounted on a vehicle such as an automobile and configured as a unit that connects a power source 4 such as a battery to a plurality of loads 2 such as a lamp and a motor. The vehicle load control device 1 controls power supply from the power source 4 to the loads 2. The vehicle load control device 1 may be provided on a route of a wire harness (hereinafter also referred to as "W/H" simply) in the vehicle or may be detachably attached to the W/H with a connector or the like.

A control program rewriting system 100 illustrated in FIG. 2 includes the vehicle load control device 1, a plurality of loads 2, an information processing device 3, and the power source 4. Each of the loads 2 is an electric component of the vehicle, such as a lamp or a motor. Therefore, the loads 2 may have either the same or different load current. For example, a load A2 is a load driven with a current value I1 of current flowing from a switching element 14 (SW1) to a connection portion 13(a). On the other hand, a load B2 is connected to a plurality of connection portions 13(b, c) that are connected in parallel, therefore, the load B2 is a load driven with a total of current values (I2+I3) of current flowing from the switching elements 14 (SW2, SW3) to the connection portions 13(*b, c*). Here, the electric components of the vehicle include not only standard components but also optionally equipped components. The information processing device 3 includes, for example, a personal computer capable of wired or wireless communication. The information processing device 3 includes a central processing unit (CPU) 30, a memory 31, and a communication unit 32. The CPU 30 is a selection unit and serves as a central calculation processing device that controls each unit of the information processing device 3. The CPU 30 is connected to the memory 31 and the communication unit 32. The memory 31 is a storage unit, and is formed of, for example, a semiconductor memory such as a random access memory (RAM) or a magnetic storage device such as a hard disk drive (HDD). The communication unit 32 is a second communication unit, and communicates with the vehicle load control device 1 by a predetermined communication method. The predetermined communication method includes, for example, serial communication such as RS-232C.

The vehicle load control device 1 illustrated in FIG. 1 includes a power source connection portion 10, a communication connection portion 11, a GND 12, the connection portions 13(*a* to *d*), the switching elements 14 (SW1 to SW4), a power source IC 15, a communication IC 16, a microcomputer 17, a power source wire 18, a control signal line 19, and a communication line 20.

The power source connection portion 10 is, as illustrated in FIG. 2, connected to the power source 4 through a power source line 5 including a power source wire and the like provided in the W/H. The power source connection portion 10 is also connected to the switching elements 14 and the power source IC 15 through the power source wire 18 as illustrated in FIG. 1.

The communication connection portion 11 is connected to the information processing device 3 through a communication cable 6 such as an RS232C cable as illustrated in FIG. 2. The communication connection portion 11 is also connected to the communication IC 16 as illustrated in FIG. 1. The GND 12 is grounded to the GND (for example, the vehicle body of the vehicle) common to the cathode side of the power source 4 as illustrated in FIG. 2. Moreover, the GND 12 is connected to the microcomputer 17 as illustrated in FIG. 1.

One load 2 can be connected to each of the connection portions 13, or one load 2 may be connected to at least two connection portions 13. For example, as illustrated in FIG. 1, the load A2 that is driven at a current value of I1 is connected to the connection portion 13(*a*) and the load B2 that is driven with the total current value (I2+I3) is connected to the connection portions 13(*b, c*). Note that the load 2 is not connected to the connection portion 13(*d*). Furthermore, as illustrated in FIG. 3, a load C2 is connected to the connection portions 13(*b* to *d*). That is to say, the connection portions 13(*b* to *d*) is connected in parallel to one load C2. In this manner, one load 2 can be connected to one or more of the connection portions 13. The connection portions 13 is respectively connected in parallel to the power source connection portion 10 through the switching elements 14.

Each of the switching elements 14 is a semiconductor switch formed of a transistor, a metal-oxide-semiconductor field-effect transistor (MOS-FET), or the like. Each switching element 14 has one end connected to the connection portion 13 and the other end connected to the power source connection portion 10 through the power source wire 18. Each switching element 14 is connected to the microcomputer 17 through the control signal line 19. When the switching element 14 receives an ON signal from the microcomputer 17, the switching element 14 is turned on and the power is supplied from the power source 4 to the connection portion 13. On the other hand, when the switching element 14 receives an OFF signal, the switching element 14 is turned off and the power from the power source 4 is blocked. In this manner, each switching element 14 is provided for each connection portion 13, the power is supplied from the power source 4 to the connection portion 13 when the switching element 14 is in the ON state, and the power from the power source 4 is blocked when the switching element 14 is in the OFF state.

The power source IC 15 is connected to the power source connection portion 10 and the microcomputer 17 as illustrated in FIG. 1. The power source IC 15 is an integrated circuit (IC) that converts the power supply voltage supplied from the power source 4 into the power supply voltage for the microcomputer 17, and supplies the converted voltage to the microcomputer 17.

The communication IC 16 is a communication unit, that is, a first communication unit that is connected to the communication connection portion 11 and the microcomputer 17. The communication IC 16 is an integrated circuit (IC) that performs the communication by the aforementioned communication method with the information processing device 3.

The microcomputer 17 is also referred to as a controller that controls the ON/OFF of the switching elements 14 in the present embodiment, and includes a central processing unit (CPU), a read-only memory (ROM), a random access memory (RAM), an interface, and the like. The microcomputer 17 is driven by the power supplied from the power source IC 15. The microcomputer 17 controls the communication IC 16 to exchange the data, the control program, the driving signal, and the like with the devices connected to the communication connection portion 11 through the communication cable 6. The devices connected to the communication connection portion 11 include what is called an engine control unit (ECU), the information processing device 3, and the like in the vehicle. The microcomputer 17 transmits the ON signal or the OFF signal to each switching element 14 through the control signal line 19. The microcomputer 17 has a function as a current detector in addition to the function as the controller. For example, the microcomputer 17 detects the current flowing in the switching elements 14 while the switching elements 14 are in the ON state, i.e., the current values (I1, I2, I3, and I4) of the current flowing in the connection portions 13, and stores the values in the RAM.

The microcomputer 17 implements the function as the controller or the function as the current detector when the CPU executes the control program read out from the RAM (or the ROM). The microcomputer 17 in the present embodiment has a determination mode in which the switching elements 14 are individually controlled based on the control program and the connection form of the connection portions 13 and the load 2 (hereinafter also simply referred to as "connection form") is determined. The control program herein described is a computer program to execute the determination mode in which the connection form is determined, and includes the control program to execute the process of the flowchart illustrated in FIG. 4 which will be described below. In the determination mode, for example, in the case of the connection form illustrated in FIG. 1, it is determined that the load A2 is connected to the single connection portion 13(*a*), the load B2 is connected to the two connection portions 13(*b, c*) that are connected in parallel, and the load 2 is not connected to the connection portion 13(*d*).

Next, with reference to FIG. 4 to FIG. 7, description is made of an example of the control process to be executed in the vehicle load control device 1 according to the present embodiment in the determination mode. FIG. 4 is a flowchart illustrating one example of a determination process of the connection form to be executed in the vehicle load control device in a determination mode. FIG. 5 is an explanatory view for describing a method for determining the connection form of the loads with respect to the vehicle load control device. FIG. 6 illustrates one example of the table information indicating a relationship between the identification information indicating the connection form and the connection form pattern. FIG. 7 illustrates one example of the table information indicating the relation between the combination of identification information indicating the connection form of each connection portion and a determination result of the connection form. Note that the process of the flowchart illustrated in FIG. 4 is performed by executing the control program that the CPU in the microcomputer 17 reads out from the RAM. Based on the flowchart of FIG. 4, the operation of the vehicle load control device 1 is described with reference to FIG. 5, FIG. 6, and FIG. 7. The illustrated process steps are triggered by the power supply to the microcomputer 17, for example.

In Step S1, the microcomputer 17 transmits the ON signal to turn on all the switching elements 14 in the initial state, detects the current values of the current flowing from the switching elements 14 to the connection portions 13(*a* to *d*), and stores the values as the initial current values in the RAM.

In Step S2, the microcomputer 17 refers to the current value stored in the RAM in Step S1 and determines whether the load 2 is connected to the connection portion 13(*a*). Specifically, the microcomputer 17 determines whether the current value of the current flowing from the switching element 14 (SW1) to the connection portion 13(*a*) is 0. If the result of determination in Step S2 indicates that the load 2 is not connected to the connection portion 13(*a*), the process shifts to Step S4. On the other hand, if the load 2 is connected to the connection portion 13(*a*), the process advances to Step S3.

In Step S3, the microcomputer 17 transmits the OFF signal to turn off the switching element 14 (SW1), detects the current values of the current flowing from the switching elements 14 (SW2 to SW4) other than the switching element 14 (SW1) to the connection portions 13(*b* to *d*), and then stores the values as the determination current values in the determination state in the RAM. Then, the microcomputer 17 compares the initial current value stored in the RAM in Step S1 with the determination current value, and based on the change between the two current values, determines the connection form of the load 2 connected to the connection portion 13(*a*). For example, as illustrated in FIG. 5, in the case where the switching element 14 (SW1) is turned off, when only the current value of the current flowing from the switching element 14 (SW2) to the connection portion 13(*b*) increases and the current value of the current flowing from the other switching elements 14 (SW3, SW4) to the connection portions 13(*c, d*) remains unchanged (see the reference symbol 50), the microcomputer 17 determines that the load 2 is connected to the two connection portions 13(*a, b*) that are connected in parallel. Then, the microcomputer 17 sets identification information 60*a* for the determined connection form with reference to table information 60 illustrated in FIG. 6. For example, if the connection form determined by the microcomputer 17 indicates that the two connection portions 13(*a, b*) are connected in parallel and connected to the load 2, a control code "0X01" (bit) is set as the identification information 60*a* for such a connection form. In the present process step, the connection form in which the load 2 is connected to the two connection portions 13(*c, d*) that are connected in parallel is also possible; thus, a control code "0X07" may also be applicable. After that, the microcomputer 17 turns on the switching element 14 (SW1) by transmitting the ON signal, and then the process advances to Step S4.

In Step S4 to Step S9, the processes similar to the above steps are performed. That is to say, in Step S4, Step S6, and Step S8, the microcomputer 17 determines whether the load 2 is connected to each of the connection portions 13 (*b* to *d*). In the case where the load 2 is connected, the switching elements 14 (SW2 to SW4) are turned off, and the determination current values of current flowing from the switching elements 14 other than the switching element 14 in the OFF state to the connection portions 13 are detected. By comparing the initial current values with the determination current values, the connection form of the loads 2 connected to the connection portions 13 (*b* to *d*) is determined based on the change between the current values (Steps S5, S7, and S9). The microcomputer 17 sets the identification information 60*a* for each connection form.

In Step S10, the microcomputer 17 determines the connection form of all the loads 2 on the basis of the identification information 60*a* set to the connection portions 13 in Steps S2 to S9 described above, and ends the present process. For example, as indicated by the part surrounded by a dotted line in FIG. 7, if the identification information 60*a* set to the connection portion 13(*a*) is "0X01" (=0X01) and the identification information 60*a* set to the connection portion 13(*c*) is "0X00" (=0X00), the microcomputer 17 determines the connection form of all the loads 2 to be the form in which "the connection portions a and b are connected in parallel". In this case, the control code "0X01" is set as the identification information 60*a* indicating the connection form of all the loads 2. On the other hand, if the identification information 60*a* set to the connection portion 13(*a*) is "0X01" (=0X01) and the identification information 60*a* set to the connection portion 13(*c*) is other than "0X00" (≠0X00), the microcomputer 17 determines the connection form of all the loads 2 to be the form in which "the connection portions a and b are connected in parallel and the connection portions c and d are connected in parallel" and a control code "0X07" is set as the identification information 60*a* indicating the connection form of all the loads 2.

Figure 8:
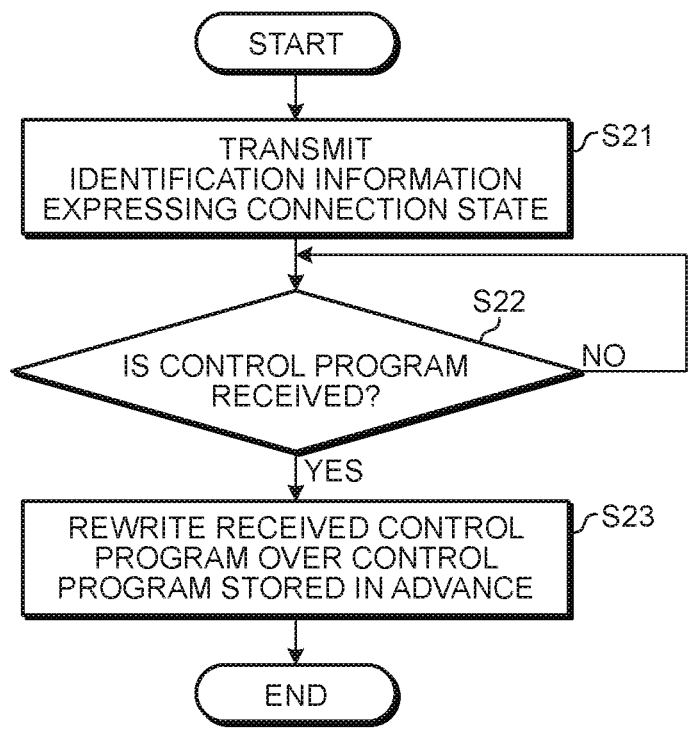
FIG. 8 is a flowchart illustrating one example of a control program rewriting process to be executed in the vehicle load control device.
Figure 9:
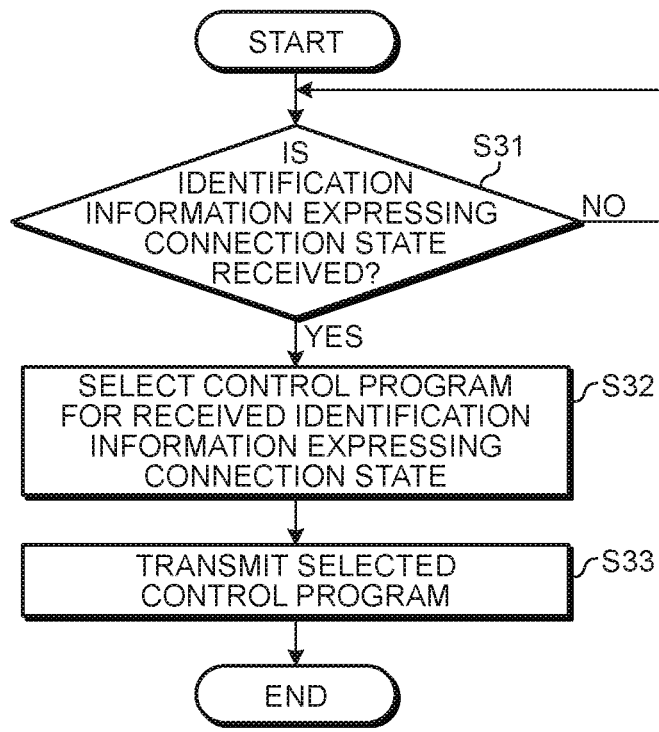
FIG. 9 is a flowchart illustrating one example of a control program selection process to be executed in an information processing device.

Next, with reference to FIG. 8 and FIG. 9, description is made of a control program rewriting method according to the present embodiment to be executed in the control program rewriting system 100 structured as described above. FIG. 8 is a flowchart illustrating one example of the control program rewriting process to be executed in the vehicle load control device. The process in the flowchart illustrated in FIG. 8 is performed by executing a computer program that rewrites the control program read out by the CPU in the microcomputer 17 from the ROM or the like. FIG. 9 is a flowchart illustrating one example of a control program selection process to be executed in the information processing device. Note that the CPU 30 in the information processing device 3 performs the process in the flowchart illustrated in FIG. 9 by executing a computer program which selects the control program read out from the memory 31. With reference to the flowcharts illustrated in FIG. 8 and FIG. 9, the operation of the control program rewriting system is described. Note that the process step in the drawings is started after the end of the process in the flowchart illustrated in FIG. 4, for example.

As shown in FIG. 8, in Step S21, the microcomputer 17 transmits the identification information 60a indicating the connection form of all the loads 2 set in the determination process of the connection form illustrated in FIG. 4 to the information processing device 3 through the communication cable 6 by the communication IC 16.

In Step S22, the microcomputer 17 determines whether the control program has been received from the information processing device 3. If the control program has not been received, the microcomputer 17 waits for the control program until receiving it, on the other hand, if the control program has been received, the process advances to Step S23.

In Step S23, the microcomputer 17 rewrites the control program stored in the RAM into the received control program (or writes in the received control program), and thus, the present process is completed.

As shown in FIG. 9, in Step S31, the CPU 30 determines whether the communication unit 32 has received the identification information 60a indicating the connection form of all the loads 2 from the vehicle load control device 1. The identification information 60a herein referred to is the control code, and corresponds to, for example, "0X01" or the like. If the result of determination in Step S31 indicates that the identification information 60a indicating the connection form of all the loads 2 has not been received, the CPU 30 waits for the reception, on the other hand, if the identification information 60a indicating the connection form of all the loads 2 has been received, the process advances to Step S32.

In Step S32, the CPU 30 selects the control program for the received identification information 60a indicating the connection form of all the loads 2 from among a plurality of control programs stored in advance in the memory 31, and then the process advances to Step S33.

In Step S33, the CPU 30 transmits the control program selected in Step S32 to the vehicle load control device 1 through the communication unit 32, and thus, the present process is completed.

In the vehicle load control device 1 with the above structure, the microcomputer 17 executes the control program in accordance with the identification information 60a indicating the connection form of all the loads 2, thereby individually controlling the switching elements 14 in response to the received driving signal. For example, upon the reception of the driving signal for driving the load A2 connected to the connection portion 13(a) from the ECU in the vehicle through the communication IC 16, the microcomputer 17 turns on the switching element 14 (SW1) and supplies the power from the connection portion 13(a) to the load A2. On the other hand, upon the reception of the driving signal to drive the load B2 connected to the connection portions 13 (b, c) from the ECU, the microcomputer 17 turns on the switching elements 14 (SW2, SW3) at the same time and supplies the power to the load B2 connected to the connection portions 13(b, c). Moreover, upon the reception of the driving signal for driving the load C2 connected to the connection portions 13(b to d) from the ECU, the microcomputer 17 turns on the switching elements 14 (SW2 to SW4) at the same time and supplies the power to the load C2 connected to the connection portions 13(b to d). In this manner, the vehicle load control device 1 can cause the switching elements 14 to be driven in parallel in accordance with the magnitude of the load current of the loads 2. This makes it easier to mount or exchange electric components with different amounts of load current, and the versatility of the hardware configuration can be improved.

The vehicle load control device 1 with the above-described structure repeatedly makes the determination state in which at least one of the switching elements 14 is turned off from the initial state in which the switching elements 14 are all in the ON state until all of the switching elements 14 are made to have different ON/OFF states. For each connection portion 13, the connection form is determined on the basis of the change between the initial current value detected in the initial state and the determination current value detected for each determination state. This makes it possible to automatically determine the connection form of the load 2 connected to the connection portions 13 of the switching elements 14.

As described above, the vehicle load control device 1 according to the present embodiment includes the connection portions 13 that are connected in parallel to the power source 4 of the vehicle and one or more of which are connectable to one load 2, the switching elements 14 that are provided corresponding to the respective connection portions 13, and each supply the power from the power source 4 to the connection portion 13 in the ON state, and block the power from the power source 4 in the OFF state, and the microcomputer 17 that has a determination mode in which the switching elements 14 are controlled individually on the basis of the control program, and the connection form of the connection portions 13 and the load 2 is determined. The microcomputer 17 in the determination mode repeatedly makes a determination state in which at least one of the switching elements 14 is turned off from an initial state in which the switching elements 14 are all in an ON state until all of the switching elements 14 are made to have different ON/OFF states, and determines the connection form for each connection portion 13 on the basis of a change between an initial current value detected in the initial state and a determination current value detected for each determination state. The microcomputer 17 controls the switching elements 14 individually on the basis of the control program in accordance with the connection form determined by the determination mode. This enables the microcomputer 17 in the determination mode to automatically determine the connection form of the load 2 connected to the connection portions 13. Then, the microcomputer 17 executes the control program in accordance with the connection form and controls the switching elements 14 individually, and thus, the microcomputer 17 can control the driving of the load 2 with the large load current by turning on or off the switching elements 14 at the same time by executing a control program corresponding to the connection form to individually control the switching elements 14. By controlling the ON/OFF state of the switching elements 14 at the same time with the switching elements 14 arranged in parallel to one load 2, the driving of the load 2 with the large load current can be controlled; and this enables one kind of vehicle load control device 1 to control various amounts of loads 2 ranging from the small-current load with the small load current to the large-current load with the large load current.

In the vehicle load control device 1 described above, the communication IC 16 as the communication unit transmits the identification information 60a indicating the connection form determined by the determination mode to the information processing device 3, and receives the control program selected in accordance with the identification information 60a indicating the connection form in the information processing device 3. The microcomputer 17 as the controller rewrites the control program stored in the RAM into the control program received by the communication IC 16. This eliminates the necessity of the vehicle load control device 1 to store the control programs in advance, and the capacity of the memory in the microcomputer 17 can be minimized. In addition, if the connection form of the load 2 connected to the connection portion 13 has changed, the control program can be rewritten into the necessary control program.

As described above, by the control program rewriting method according to the present embodiment, the communication IC 16 of the vehicle load control device 1 executes the transmission step (Step S21 in FIG. 8) of transmitting the identification information 60a indicating the connection form determined by the microcomputer 17 and the reception step (Step S22) of receiving the control program selected in accordance with the identification information 60a indicating the connection form in the information processing device 3. The microcomputer 17 executes the rewriting step (Step S23 in FIG. 8) of rewriting the control program stored in advance into the control program received in the reception step. Thus, only the necessary control program is stored in the RAM or the like in the microcomputer 17, so that the capacity of the memory such as the RAM can be reduced.

As described above, by the control program rewriting system according to the present embodiment, in the vehicle load control device 1, the communication IC 16 transmits the identification information 60a indicating the connection form determined by the microcomputer 17 to the information processing device 3. In the information processing device 3, the CPU 30 selects the control program in accordance with the identification information 60a indicating the connection form received in the communication unit 32, and transmits the selected control program to the vehicle load control device 1 through the communication unit 32. In the vehicle load control device 1, the microcomputer 17 rewrites the control program stored in advance into the control program received in the communication IC 16. Thus, only the necessary control program is stored in the RAM or the like in the microcomputer 17, so that the capacity of the memory such as the RAM can be reduced.

Modified Example

Although the vehicle load control device 1 and the information processing device 3 illustrated in FIG. 2 are connected to each other with a wire of the communication cable 6 in the above description, the vehicle load control device 1 and the information processing device 3 may be wirelessly connected by a predetermined wireless communication method. The wireless communication method herein described may include, but is not limited to, TransferJet (registered trademark), Bluetooth (registered trademark), Wi-Fi (Wireless Fidelity), ZigBee (registered trademark), or the like. When the vehicle load control device 1 and the information processing device 3 are wirelessly connected, the rewriting of the control program can be executed in a state where the vehicle load control device 1 is mounted on a vehicle.

Although the microcomputer 17 includes the current detector in the above description, the present embodiment is not limited thereto and the microcomputer 17 and the current detector may be separately structured.

In the above description, the four connection portions 13 are provided and the four switching elements 14 are provided in accordance with the connection portions 13 but the number of connection portions 13 and the number of switching elements 14 are not limited to the above numbers.

In addition, the communication IC in the microcomputer 17 receives the control program selected in accordance with the identification information 60a indicating the connection form of all the loads 2 from the information processing device 3, however, the present embodiment is not limited thereto. For example, the upgraded control program may be received alternatively. In this case, the control program stored in the RAM in the microcomputer 17 can be upgraded efficiently. Alternatively, the microcomputer 17 may have a structure in which the control programs is stored in advance in the RAM or the like, and the control program in accordance with the identification information 60a indicating the connection form of all the loads 2 may be selected from among the control programs. Moreover, since the switching elements 14 are driven by executing the control program selected in accordance with the identification information 60a, the identification information 60a may be defined as the driving setting information for driving the switching elements 14.

The vehicle load control device according to the present embodiment repeatedly makes the determination state in which at least one of the switching elements is turned off from the initial state in which the switching elements are all in an ON state until all of the switching elements are made to have different ON/OFF states, and determines the connection form for each connection portion on the basis of the change between the initial current value detected in the initial state and the determination current value detected for each determination state. This makes it possible to accomplish the automatic determination of the connection form of the load connected to the connection portions. By controlling the ON/OFF state of the switching elements at the same time with the switching elements arranged in parallel to one load, the driving of the load with the large load current can be controlled, and therefore it is possible to realize one kind of vehicle load control device capable of controlling various amounts of loads ranging from the small-current load to the large-current load.

Although the invention has been described with respect to specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle load control device comprising:
   a plurality of connection portions that are connected in parallel to a power source of a vehicle and one or more of which are connectable to one load;
   a plurality of switching elements that are provided to correspond to respective connection portions, each of the switching elements supplying power from the power source to the connection portion when the switching element is in an ON state, and blocking power from the power source when the switching element is in an OFF state;
   a controller configured to have a determination mode in which the switching elements are individually controlled based on a control program and a connection form in which the plurality of connection portions are connected to the load is determined; and
   a current detector configured to detect a current value of current flowing in the connection portion when the switching element is in the ON state, wherein
   the controller in the determination mode,
      turns on each of the switching elements to be in the ON state,
      detects an initial current value for each of the switching elements in the ON state, sequentially repeats a determination state for each the switching elements in which each of the switching elements is turned off one at a time from the ON state to be in the OFF state, detects a determination current value of each of the switching elements remaining in the ON state, and then turns on to be in the ON state the switching element that is in the OFF state, and determines the connection form for each connection portion based on a change between each of the initial current values detected in the initial state and a respective one of the determination current values detected for each determination state, and the controller controls the switching elements individually based on the control program in accordance with the connection form determined by the determination mode.

2. The vehicle load control device according to claim 1, further comprising:

a communication unit configured to communicate with an information processing device in a wired or wireless manner, wherein the communication unit transmits identification information indicating the connection form determined by the determination mode to the information processing device, and receives the control program selected in accordance with the identification information indicating the connection form in the information processing device, and the controller rewrites the control program stored in advance into the control program received by the communication unit.

3. A control program rewriting method for a vehicle load control device including:

a plurality of connection portions that are connected in parallel to a power source of a vehicle and one or more of which are connectable to one load;

a plurality of switching elements that are provided to correspond to respective connection portions, each of the switching elements supplying power from the power source to the connection portion when the switching element is in an ON state, and blocking power from the power source when the switching element is in an OFF state;

a controller configured to have a determination mode in which a connection form in which the plurality of connection portions are connected to the load is determined and to control the switching elements individually based on a control program in accordance with the connection form determined by the determination mode;

a current detector configured to detect a current value of current flowing in the connection portion when the switching element is in the ON state; and a communication unit configured to communicate with an information processing device in a wired or wireless manner, the control program rewriting method comprising the steps of:

by the controller in the determination mode,
turning on each of the switching elements to be in the ON state,
detecting an initial current value for each of the switching elements in the ON state,
sequentially repeating a determination state for each of the switching elements in which each of the switching elements is turned off one at a time from the ON state to be in the OFF state, detect a determination current value of each of the switching elements remaining in the ON state, and then turns on to be in the ON state the switching element that is in the OFF state, and determining the connection form for each connection portion based on a change between each of the initial current values detected in the initial state and a respective one of the determination current values detected for each determination state;

by the communication unit, transmitting identification information indicating the connection form determined at the determining to the information processing device;

by the communication unit, receiving the control program selected in accordance with the identification information indicating the connection form in the information processing device; and by the controller, rewriting the control program stored in advance into the control program received at the receiving.

4. A control program rewriting system in which a vehicle load control device is communicably connected to an information processing device, the vehicle load control device comprising:

a plurality of connection portions that are connected in parallel to a power source of a vehicle and one or more of which are connectable to one load;

a plurality of switching elements that are provided to correspond to respective connection portions, each of the switching elements supplying power from the power source to the connection portion when the switching element is in an ON state, and blocking power from the power source when the switching element is in an OFF state;

a controller configured to have a determination mode in which the switching elements are controlled individually based on a control program and a connection form in which the plurality of connection portions are connected to the load is determined;

a current detector configured to detect a current value of current flowing in each of the connection portions when the switching element is in the ON state; and a first communication unit configured to communicate with the information processing device in a wired or wireless manner, wherein the controller in the determination mode,
turns on each of the switching elements to be in the ON state,
detects an initial current value for each of the switching elements in the ON state,
sequentially repeats a determination state for each the switching elements in which each of the switching elements is turned off one at a time from the ON state to be in the OFF state, detects a determination current value of each of the switching elements remaining in the ON state, and then turns on to be in the ON state the switching element that is in the OFF state, and determines the connection form for each connection portion based on a change between each of the initial current values detected in the initial state and a respective one of the determination current values detected for each determination state, the first communication unit transmits identification information indicating the connection form determined by the controller to the information processing device, and receive the control program selected in accordance with the identification information indicating the connection form in the information processing device, the controller rewrites the control program stored in advance into the control program received in the first communication unit, the information processing device includes a second communication unit that receives the identification information indicating the connection form from the vehicle load control device, a storage unit that stores therein a plurality of control programs, and a selection unit that selects the control program in accordance with the identification information indicating the connection form received in the second communication unit from among the control programs stored in advance in the storage unit, and the second communication unit transmits the control program selected by the selection unit to the vehicle load control device.

5. The vehicle load control device according to claim 1, wherein the connection form is configured to include a single connection form in which the load is connected to the one connection portion and a parallel connection form in which the load is connected to the plurality of connection portions that are connected in parallel, and the controller is configured to determine the single connection form or the parallel connection form as the connection form.

* * * * *